United States Patent
Kim et al.

(10) Patent No.: US 8,619,704 B2
(45) Date of Patent: Dec. 31, 2013

(54) POWER SAVING METHOD FOR MOBILE TERMINAL IN WIRELESS LOCAL AREA NETWORK

(75) Inventors: Young-Soo Kim, Seoul (KR); Sunghyun Choi, Seoul (KR); Kyung-Hun Jang, Suwon-si (KR); Sung-Geun Jin, Seoul (KR); Hyo-Sun Hwang, Seoul (KR); Kwang-Hun Han, Seoul (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 781 days.

(21) Appl. No.: 11/592,380

(22) Filed: Nov. 3, 2006

(65) Prior Publication Data

US 2007/0115873 A1    May 24, 2007

Related U.S. Application Data

(60) Provisional application No. 60/733,607, filed on Nov. 4, 2005.

(30) Foreign Application Priority Data

Jun. 19, 2006    (KR) ................... 10-2006-0055055

(51) Int. Cl.
    *H04W 4/00*    (2009.01)
(52) U.S. Cl.
    USPC ........ 370/331; 455/436; 455/432.1; 455/458; 455/574
(58) Field of Classification Search
    None
    See application file for complete search history.

(56) References Cited

U.S. PATENT DOCUMENTS 6,463,307 B1 *  10/2002  Larsson et al. ............... 455/574
6,625,467 B2 *   9/2003  New et al. .................... 455/525

(Continued)

FOREIGN PATENT DOCUMENTS

EP          1519515 A1     3/2005
JP         2003-060653     2/2003

(Continued)

OTHER PUBLICATIONS

Yun Won Chung et al., Performance Analysis of IP Paging and Power Saving Mode in IP-Based Mobile Networks, 2004.

(Continued)

*Primary Examiner* — German J Viana Di Prisco
(74) *Attorney, Agent, or Firm* — NSIP Law

(57) ABSTRACT

The present invention relates to a power saving in a wireless local area network including a plurality of access points providing at least one mobile station in each access point cell boundary with access service, the mobile station transits between an active mode and an idle mode. The power saving method includes grouping the access points into at least one paging group with a paging group boundary; determining if the a mobile station is in the idle mode in which the mobile station switches between an awake state and a doze state every predetermined time interval, or the active mode in which the mobile station is in the awake mode; and if the mobile station is in the idle mode enabling an idle handoff which occurs only when the mobile station crosses the paging group boundary. In the present invention, the handoff occurs when the mobile terminal crosses the paging group boundary but not the access point cell in the idle mode, resulting in reduction of power consumption.

20 Claims, 5 Drawing Sheets

(56) References Cited

U.S. PATENT DOCUMENTS

| | | | |
|---|---|---|---|
| 2001/0049287 A1* | 12/2001 | Plunkett | 455/436 |
| 2002/0191572 A1 | 12/2002 | Weinstein et al. | |
| 2003/0129980 A1 | 7/2003 | Sayeedi | |
| 2003/0145092 A1 | 7/2003 | Funato et al. | |
| 2004/0005894 A1 | 1/2004 | Trossen et al. | |
| 2004/0165563 A1 | 8/2004 | Hsu et al. | |
| 2005/0002346 A1* | 1/2005 | Bichot | 370/312 |
| 2005/0036510 A1* | 2/2005 | Sarikaya et al. | 370/469 |
| 2005/0090259 A1* | 4/2005 | Jain et al. | 455/439 |
| 2005/0094558 A1 | 5/2005 | Lu | |
| 2005/0232200 A1* | 10/2005 | Jeong et al. | 370/331 |
| 2005/0249161 A1* | 11/2005 | Carlton | 370/331 |
| 2005/0265360 A1* | 12/2005 | Kim et al. | 370/400 |
| 2005/0277417 A1* | 12/2005 | Yoon et al. | 455/436 |
| 2006/0088019 A1 | 4/2006 | Liebsch | |
| 2006/0121883 A1* | 6/2006 | Faccin | 455/411 |
| 2007/0091934 A1* | 4/2007 | Myles et al. | 370/503 |
| 2007/0104179 A1* | 5/2007 | Srinivasan et al. | 370/351 |
| 2007/0165537 A1* | 7/2007 | Magnusson et al. | 370/254 |

FOREIGN PATENT DOCUMENTS

| | | |
|---|---|---|
| JP | 2003-517741 | 5/2003 |
| JP | 2003-273882 | 9/2003 |
| JP | 2005-523671 | 8/2005 |
| JP | 2006-129450 | 5/2006 |
| KR | 10-2000-0034217 | 6/2000 |
| KR | 10-2003-0080079 | 10/2003 |
| KR | 10-2004-0053992 A | 6/2004 |
| KR | 10-2005-0104392 | 11/2005 |
| WO | WO 02/07459 | 1/2002 |
| WO | WO 03/065237 | 8/2003 |
| WO | WO 2005/041612 | 5/2005 |

OTHER PUBLICATIONS

Marco Liebsch et al., Utilization of the IEEE802.11 Power Save Mode with IP Paging, 2005.

Sunggeun Jin et al., A Novel Idle Mode Operation in IEEE802.11 WLANs, 2006.

B. Sarikaya et al., Tracking Agent Based Paging for Wireless Lans, in Proc. IEEE CCNC'04, 2004.

X. Zhan et al., P-MIP: Paging Extensions for Mobile IP, ACM Mobile Networks and Applications, Jul. 2002.

R. Ramjee et al., IP Paging Service for Mobile Hosts, Proc. ACM MobiCom'01, 2001.

E. Shih et al., Wake On Wireless: An Event Driven Energy Saving Strategy for Battery Operated Devices, Proc. ACM MobiCom'02, 2002.

Japanese Office Action issued on Sep. 21, 2010, in corresponding Japanese Application No. 2008-538824 (2 pages).

Japanese Office Action issued on Mar. 11, 2011, in counterpart Japanese Application No. 2008-538824 (7 pages).

Lee et al., "An Efficient Power-Saving Mechanism for Integration of WLAN and Cellular Networks," *IEEE Communications Letters*, vol. 9, No. 12, Dec. 2005, pp. 1052-1054.

Shin et al., "Improving the Latency of 802.11 Hands-off using Neighbor Graphs," *MobiSys '04*, Jun. 2004, pp. 70-83.

Roh, Hyun Suk, et al., "Paging Scheme for High-Speed Portable Internet (HPi) System," Proceedings of the 8th International Conference on Advanced Communication Technology (ICACT 2006), Feb. 20, 2006, pp. 1729-1732. (4 pages, in English).

Korean Decision on Grant issued on Dec. 30, 2010, in corresponding Korean Patent Application No. 10-2006-0055055 (5 pages).

"NAS Functions related to Mobile Station (MS) in idle mode (Release 5)," 3GPP TS 23,122 Version 5.1.0 Release 5, Sep. 2002, pp. 1-34.

\* cited by examiner

POWER SAVING METHOD FOR MOBILE TERMINAL IN WIRELESS LOCAL AREA NETWORK

PRIORITY

This application claims the benefit under 35 U.S.C. §119 (a) of an application filed with the U.S. Patent and Trademark Office on Nov. 4, 2005 and assigned Ser. No. 60/733,607 and filed in the Korean Intellectual Property Office on Jun. 19, 2006 and assigned Ser. No. 2006-55055, the contents of which are incorporated herein by reference.

BACKGROUND OF THE INVENTION

1. Field of the Invention

The present invention relates to a wireless local area network (WLAN) and, in particular, to a power saving method for WLAN exploiting a novel idle mode operation.

2. Background of the Related Art

Recently, the IEEE 802.11 WLAN standard technology has become a prevailing technology for the broadband wireless Internet access. New applications such as Internet Protocol (IP) telephony are fast emerging today. The IP phones require a functionality to inform the user of sporadic incoming calls even if the user holding a mobile Host (MH) moves around. For the battery-powered IP phone devices, the standby time extension is a key concern for the market acceptance. The current IEEE 802.11 standard based system is not optimized for such an operation. The reason is rooted on IEEE 802.11 WLAN standard, which defines only two operation modes in which a MH can operate, namely, Active mode (AM) and Power Saving mode (PSM). In both modes, since an MH always has to stay connected with one of the access points (APs) even when there is no traffic to/from the MH, it has to perform a handoff at every AP cell boundary. That is, the IEEE 802.11 WLAN is naturally weak in supporting the mobility of MHs when there is no traffic to be served for the MHs.

Due to the lack of such an idle mode operation, both IP paging and PSM have been considered as the alternatives to the Idle Mode (IM) operation. An IP paging technique has been proposed by B. Sarikaya and T. Ozugur, "Tracking Agent Based Paging for Wireless Lans," in Proc. IEEE CCNC'04, 2004. In this technique, the IP paging supports IP-level mobility when an MH operates in PSM. The proposed IP paging does not support an efficient power consumption for an MH since both IP level paging and PSM operate so independently that IP paging has nothing to do with a PSM. For a longer standby time when adopting the IP paging, more suitable power saving schemes other than PSM needs to be considered.

Other IP paging schemes have been proposed by X. Zhan, J. Gomez, G. Castellanos, and A. T. Campbell, "P-MIP: Paging Extensions for Mobile IP," ACM Mobile Networks and Applications, July 2002, and by R. Ramjee, L. Li, T. La Porta, and Sneha Kasera, "IP Paging Service for Mobile Hosts," in Proc. ACM MobiCom'01, 2001. If there is no Media Access Control (MAC) level paging scheme, IP paging could be used as an alternative. However, because the original IP-paging concept was developed to support the mobility for IP layer regardless of MAC layer, these IP paging schemes deal with only IP-paging algorithms and ignore MAC operation under the assumption that the MAC of an idle mode operates in an efficient power saving manner. In the case of the IEEE 802.11 WLAN standard, the MAC operates in the PSM when utilizing the IP paging. The MH in PSM, while running the IP paging, is not able to fall into idle state properly since the MH has to perform necessary operations in order to maintain the connection with an AP and perform IP paging-related operations. "Wake On Wireless: An Event Driven Energy Saving Strategy for Battery Operated Devices", E. Shih, P. Bahl, and M. J. Sinclair, in Proc. ACM MobiCom'02, 2002 discloses a good example of power saving by adopting the paging concept. In this power-saving technique a practical device having ability to receive paging signals is developed, and the device wakes up an idle MH when a packet destined to the MH exists. The device for paging works so well that the MH with the device achieves longer standby time. However, this power saving technique is not standard compliant.

SUMMARY OF THE INVENTION

The present invention has been made in an effort to solve the above problems, and it is an object of the present invention to provide a power-saving method based on a novel IM operation for WLAN.

It is another object of the present invention to provide a power-saving method capable of extending battery life by improving the efficiency of the power consumption.

It is another object of the present invention to provide a power-saving method capable of improving the power-saving performance by minimizing the handoff-related operations, while maintaining compatibility to the IEEE 802.11 WLANs.

In one aspect of the present invention, the above and other objects are achieved by a power saving method for wireless local area network including a plurality of access points providing at least one mobile station in each access point cell boundary with access service, the mobile station transiting between an active mode and an idle mode. The power saving method includes grouping the access points into at least one paging group with a paging group boundary; determining whether the a mobile station is in the idle mode in which the mobile station switches between an awake state and a doze state every predetermined time interval, or the active mode in which the mobile station is in the awake mode; and enabling an idle handoff which occurs only when the mobile station crosses the paging group boundary, if the mobile station is in the idle mode.

In another aspect of the present invention, the above objects and other objects are achieved by a power saving method for wireless communication system including a plurality of stationary stations providing at least one mobile station in each stationary station cell with access service, the mobile station transiting between an awake state and a doze state. The power saving method includes the steps of grouping the stationary stations into at least one paging group with a paging group boundary; determining if the a mobile station is in the doze state; and if the mobile station is in the doze state enabling to perform a handoff only when the mobile station crosses the paging group boundary.

In still another aspect of the present invention, a power saving method includes grouping the stationary stations into at least one paging group with a paging group boundary; determining if the a mobile station is in the doze state or in the awake state; and if the mobile station is in the doze state enabling a handoff across the paging group boundary but not across the cell boundary.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENT

With reference to the accompanying drawings, the present invention will be described in order for those skilled in the art to be able to implement. In the following description of the present invention, detailed descriptions of well-known functions and structures incorporated herein will be omitted when it may obscure the subject matter of the present invention.

The power-saving method of the present invention is implemented with a novel IM operation which consists of paging, idle handoff, delayed handoff, for IEEE 802.11 WLAN. Under this operation, the MH can maintain the doze state and performs less operation than in the PSM. The power-saving method of the present invention is compatible with the IEEE 802.11 WLAN standard. With the power saving method of the present invention, an MH does not perform any handoff within a predefined Paging Area (PA). The handoff with minimum operation, called idle handoff, is performed only when an MH leaves a PA. The paging provides a method to inform MHs in the IM of a new packet arrival resulting in an efficient power saving manner. The IP-level handoff is deferred until a paging success, and hence, it is called delayed handoff.

In the present invention, a new mode, i.e., IM, for IEEE 802.11 WLAN is introduced. In order to maximize the power saving, the operations required for the IM should be minimized. When a wireless network interface card (WNIC) is in the IM, it performs only essential operations to wake up in the future. The necessary operations for the IM are defined as follows:

1. A handoff does not occur at every cell boundary unlike a WNIC in the PSM. A handoff, called idle handoff, is performed only when an MH leaves a PA to enter another PA.

2. When a WNIC is in the IM, the WNIC is not associated with any AP. The only thing the WNIC in the IM has to do is to periodically listen to the beacons at every predefined interval in order to switch itself to Active Mode when a packet destined to itself arrives. The typical beacon listening interval for receiving beacons to wake up is set to be 1 s, while beacons are typically transmitted by APs every 100 ms.

3. Only a successful paging makes a WNIC in the IM enter Active Mode.

Protocols for Idle Mode

Figure 1:
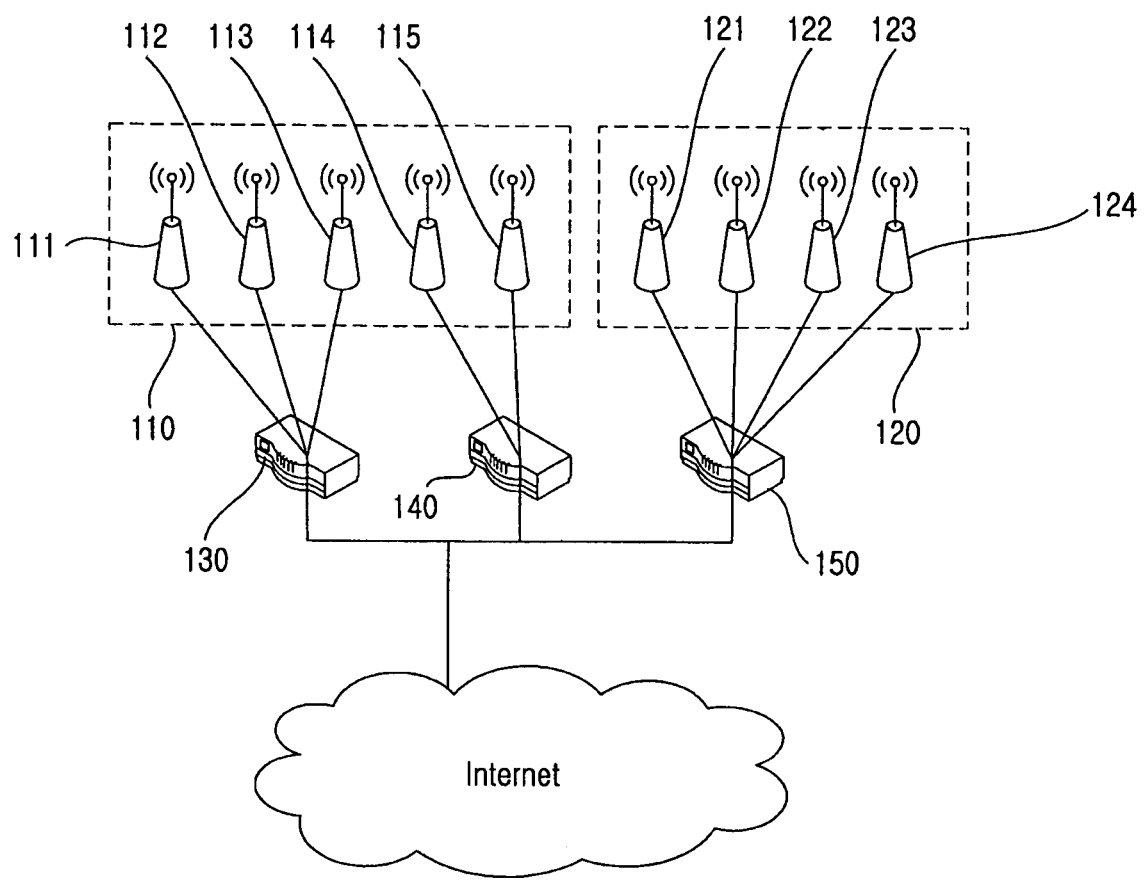
FIG. 1 is a diagram illustrating PA structure for a power saving method according to the present invention.

FIG. 1 is a diagram illustrating PA structure for a power saving method according to the present invention.

As shown in FIG. 1, neighboring AP cells are grouped into respective PAs 110 and 120. The first PA 110 includes a plurality of APs 111, 112, 113, 114, and 115. The first, second, and third APs 111, 112, and 113 of the first PA 110 are connected to a first router 130 and the fourth and fifth APs 114 and 115 are connected to a second router 140. The second PA includes APs 121, 122, 123, and 124 that are associated with a third router 150.

The APs in the same PA have the same identifier, which is broadcasted through the beacons with a newly defined Paging Area Identifier (PAID) field. Each WNIC in the IM can differentiate a PA via its PAID.

Figure 2:
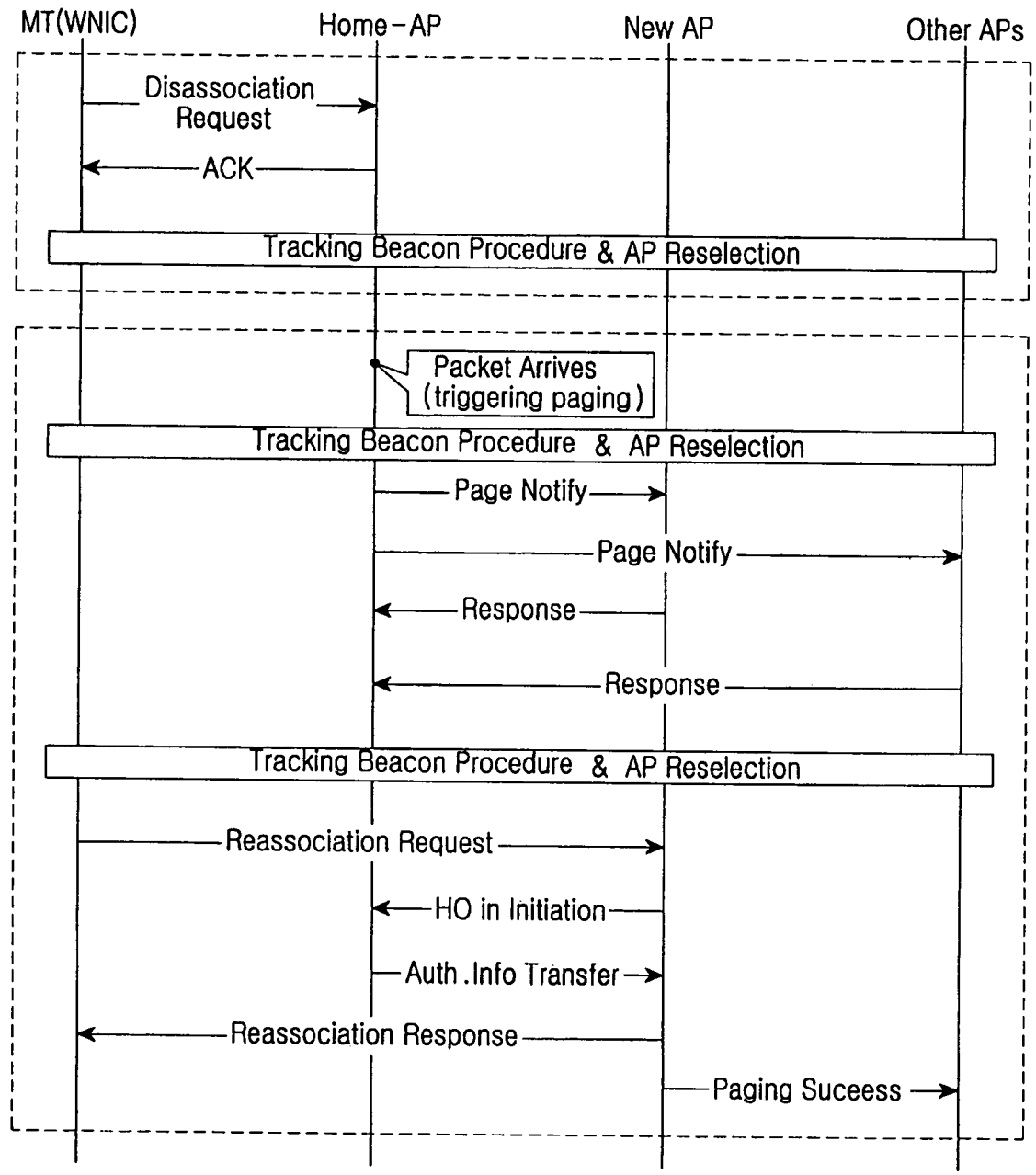
FIG. 2 is a message flow diagram illustrating an idle mode operation for the power saving method according to the present invention.

FIG. 2 is a message flow diagram illustrating an idle mode operation for the power saving method according to the present invention.

As shown in FIG. 2, after a session (e.g., a VoIP session) completion, the WNIC (located in a mobile terminal (MT)) transmits a Disassociation-Request frame with Power-saving Mode (PM) bit (in the frame control field) set to '1' in order to enter the IM. Upon receiving a Disassociation-Response frame from a presently associated AP, the WNIC in the IM can move around with the same PA while the AP, which transmitted the Disassociation-Response, keeps the WNIC's context to is perform a handoff procedure in the future. This AP is referred to as Home-AP or Home-Node. After entering the IM, the WNIC starts periodically listening to the beacons, e.g., every 1 s. Even when a WNIC recognizes the change of AP cell through the beacon information, the WNIC keeps listening to the beacons only as long as the WNIC stays in the same PA. This continuous beacon listening operation is called AP-Reselection. For an efficient AP-Reselection, there could be many optimization issues. However, the AP-Reselection issues are not considered since those are beyond the scope of the present invention. For simplicity, AP-Reselection is assumed to be performed without overhead, e.g., scanning, via optimization.

When a packet destined to a particular WNIC in the IM arrives at the Home-AP, the Home-AP broadcasts a Page-Notify message to all the APs, belonging to the same PA, which in turn start paging the destination WNIC. That is, the APs convey the paging information via their beacon frame. If a WNIC recognizes that it is paged by receiving such beacon (s) from an AP, it attempts to associate with the AP by transmitting a Reassociation-Request frame. After the new AP finds the paged WNIC successful, it starts to perform delayed handoff operation for the WNIC. After finishing all the preparations for serving the WNIC, the new AP replies to the WNIC with Reassociation-Response frame and broadcasts Paging-hit to the APs in the same PA to stop paging operations of these APs.

Idle and Delayed Handoffs

Idle handoff is the handoff that is preformed whenever a WNIC in the IM moves across a PA boundary.

Figure 3:
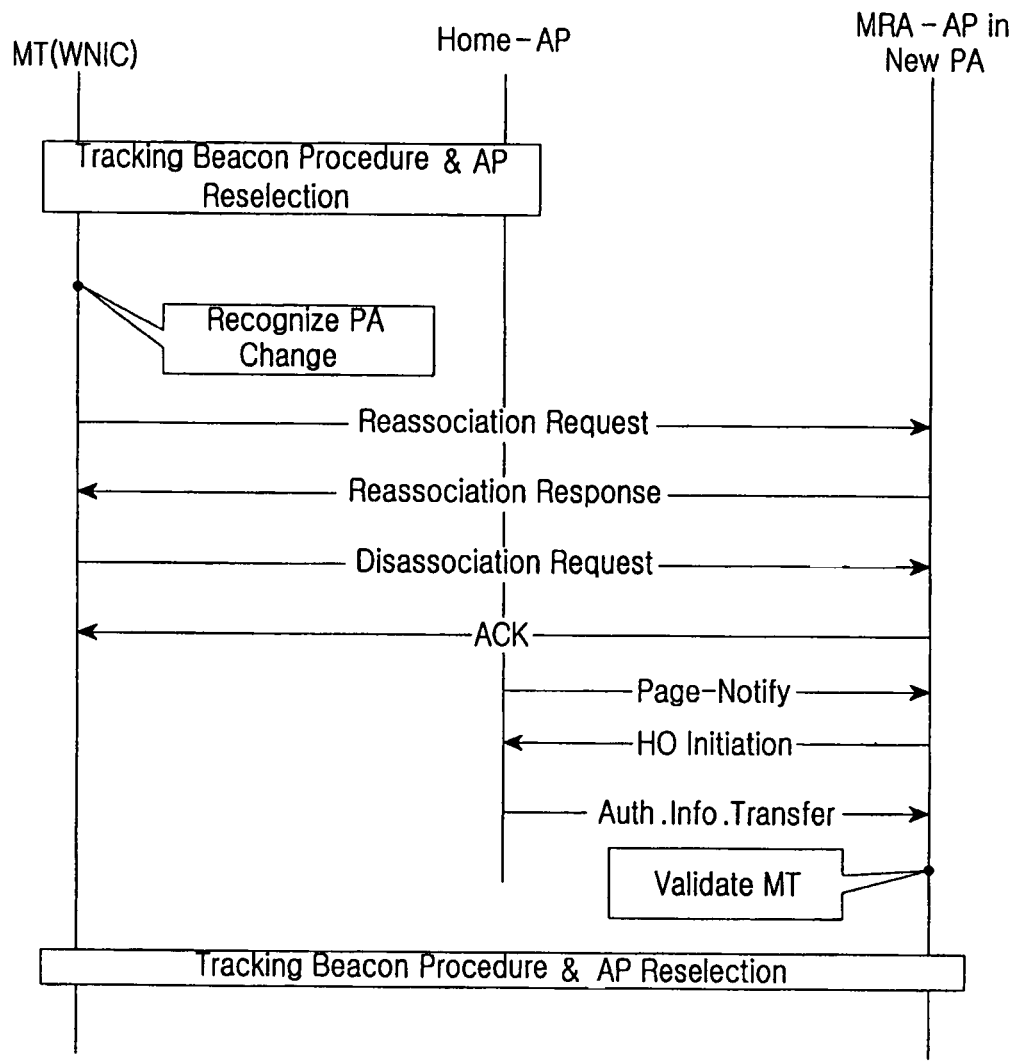
FIG. 3 is a message flow diagram illustrating an idle handoff for the power saving method according to the present invention.

FIG. 3 is a message flow diagram for explaining an idle handoff for the power saving method according to the present invention.

After a WNIC enters a new PA, which can be identified by a newly-received beacon, the WNIC transmits a Reassociation-Request frame with the Basic Service Set Identifier (BSSID) of its Home-AP. Upon receiving the Reassociation-Request frame, the new AP replies with a Reassociation-Response frame. Then, the WNIC transmits Disassociation-Request frame in the same manner as to initially enter the IM, i.e., with PM set to 1. After the completion of a successful 3-way management frame exchange, the WNIC resumes periodically listening to the beacons in order to receive the paging information. The AP, which is involved with the 3-way frame exchange, is referred to as Most Recently Associated AP (MRA-AP) or MRA-Node.

The MRA-AP initiates to exchange the context of the WNIC with the Home-AP. Through the operations, the MRA-AP performs a user validation check using the MAC address of the WNIC. Note that the user validation check is performed after the completion of the frame exchange with the WNIC in order to reduce the WNIC's awake time as well as power consumption. After a successful validation check, the Home-AP informs the old MRA-AP in the PA, which the WNIC previously visited immediately before entering the new PA, by transmitting a Remove-Context message, that the WNIC moves to the new MRA-AP. After receiving the Remove-Context message, the old MRA-AP removes the context of the WNIC. There could be several security issues about the scheme proposed in the present invention. However, more detailed security issues are beyond the scope of the present invention.

When there is at least one idle handoff, the Home-AP actually transmits a Page-Notify message to the MRA-AP, which in turn forwards it to all the APs in the same PA. Since the present invention enables IEEE 802.11 WLAN to keep track of the locations of the MHs in the IM, the IP layer related operation including IP paging becomes redundant. That is, the present invention replaces IP paging. Therefore, in the present invention, the handoff operations related to the IP layer are postponed until a successful completion of paging. For this reason, this handoff operation, which delays the activation of IP layer, will be called as a delayed handoff. During performing the delayed handoff, the operations to check the user validity are also performed.

In the present invention, VoIP is considered as the target application for analysis. When a user uses a VoIP phone, a session is initiated by an incoming or outgoing call. It is assumed that the PSM is not used while a VoIP session is on-going, i.e., the state transition from the awake state to the doze state does not occur during the whole on-going session time. Also, it is assumed that an MH is always powered on in order to receive incoming calls.

Figure 4:
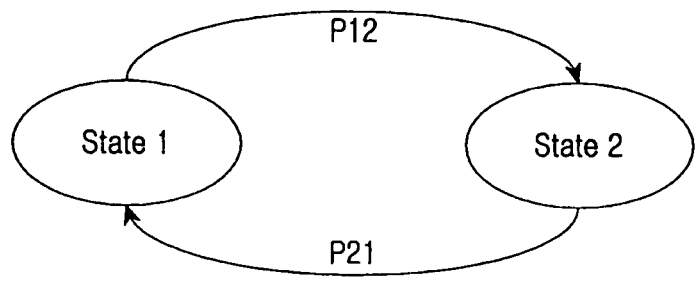
FIG. 4 is a state diagram of MH for a Markov chain modeling, according to the present invention.

FIG. 4 is a state diagram of MH for a Markov chain modeling, according to the present invention.

As shown in FIG. 4, there are two operational states: state 1 for active mode (AM) and state 2 for idle mode (IM) or power saving mode (PSM).

1. State 1 (AM): When an MH is in this state, WNIC is in the awake state and the handheld device (HD) is powered on. The MH has an on-going session for traffic. The MH performs a handoff whenever it moves across AP cell. The transition to the doze state occurs when the session is terminated.

2. State 2 (IM or PSM): When a MH is in this state, a WNIC switches between the awake and doze states every predefined time interval in order to receive the beacon including the paging information. If the IM is utilized, the WNIC performs an idle handoff when it leaves each PA. Only a successful paging or an outgoing call makes the MH enter State 1.

Since an MH with WNIC in the IM does not need to perform the IP operation as explained above, the HD transits its power-mode to standby-mode. On the other hand, when the legacy scheme, i.e., utilizing both IP paging and PSM, is performed, the MH must perform inter-AP handoff or both inter-AP handoff and IP related handoff even if IP paging scheme is adopted. By this reason, in this case, the HD is powered on.

Numerical Analysis

In the present invention, the power consumed by an MH with WNIC adopting the IM is calculated. The steady state analysis is based on the semi-Markov process because state changes occurs with a Markov chain, but take a random amount of time between changes. In the present invention, a new energy consumption model is introduced.

In order to determine the steady state probabilities and the average energy consumption of an MH in each state, i.e., State 1 and State 2, the following assumptions are taken.

1. Incoming and outgoing calls at an MH occur according to a Poisson process with rates $l_{in}$ and $l_{out}$, respectively.

2. Session holding time is generally distributed with a density function $f_s(t)$ with the mean $1/l_{out}$.

3. The cell sojourn time and the PA sojourn time are i.i.d., and follow exponential distributions with average $1/l_{cs}$ and $1/l_{PA}$, respectively. Moreover, $1/l_{PA} = \sqrt{N_{ap}}/l_{cs}$, where $N_{ap}$ is the average number of APs in a PA.

Parameters used for the analysis are listed in Table 1.

TABLE 1

| Parameter | Definition |
| --- | --- |
| $T_{bli}$ | beacon listening interval |
| $\overline{P}_{WN\_awk}$ | ave. power consumption of WNIC in awake state |
| $\overline{P}_{WN\_slp}$ | min. power consumption of WNIC in doze state |
| $\overline{P}_{HD\_act}$ | ave. power consumption of HD being active |
| $\overline{P}_{HD\_slp}$ | min. power consumption of HD being idle |
| $T_b$ | beacon frame transmission duration |
| $T_p$ | ave. time for paging procedure |
| $T_{HD\_trans}$ | ave. time for HD to switch from standby to active |
| $T_{IHO}$ | ave. time for idle handoff procedure |
| $T_{DHO}$ | ave. time for delayed handoff procedure |
| $T_{ras}$ | ave. time for reassociation procedure |
| $T_{das}$ | ave. time for disassociation procedure |
| $T_{auth}$ | ave. time for authentication procedure |
| $T_{IAPP}$ | ave. time for IAPP procedure |
| $T_{1x}$ | ave. time for 802.1x procedure |
| $T_{L3HO}$ | ave. time for L3-level handoff |
| $\overline{N}_{PA\_cng}$ | ave. number that an MH leaves PAs |
| $\overline{N}_b$ | ave. number of beacon listening in IM |
| $\overline{N}_{L2HO}$ | ave. number of L2-level handoffs |
| $\overline{N}_{L3HO}$ | ave. number of L3-level handoffs |
| $\overline{D}_p$ | ave. delay for paging message delivery |

In FIG. 4, $P_{12}$ and $P_{21}$ are the state transition probabilities, representing a session completion in State 1 and a session arrival in State 2, respectively. Both $P_{12}$ and $P_{21}$ are simply 1, and hence it is possible to easily obtain the stationary probabilities of this Embedded Markov Chain as $p_1 = \frac{1}{2}$ and $p_2 = \frac{1}{2}$, respectively. In addition, it is possible to analyze the average time, which the MH stays in each state, as $\overline{T}_1 = 1/l_s$ and $\overline{T}_2 = 1/(l_{in} + l_{out}) + \overline{D}_p$, where $\overline{D}_p = T_{bli}/2$. Then the steady state probabilities of the semi-Markov process is obtained by Equation (1):

$$P_i = \frac{p_i \overline{T}}{\hat{a}_{j=1}^2 p_i \overline{T}}, i = 1, 2 \qquad (1)$$

First, the energy $\overline{E}_1$ spent in State 1 for an arbitrary time, t, is determined as follows:

$$\overline{E}_1 = \overline{E}_{WN\_awk} + \overline{E}_{HD\_act} \qquad (2)$$

where $\overline{E}_{WN\_awk} = \overline{P}_{WN\_awk} P_1 t$ and $\overline{E}_{HD\_act} = \overline{P}_{HD\_act} P_1 t$, respectively. The energy $\overline{E}_2$ spent in State 2 for an arbitrary time, t, is dependent on whether the IM is employed or not. When the IM is employed, $\overline{E}_2 = \overline{E}_{IM}$, and the energy of the IM is defied by Equation (3):

$$\overline{E}_{IM} = \overline{E}_{WN\_slp} + \overline{E}_{HD\_slp} + \overline{E}_p l_{in}/(l_{in} + l_{out}) + \overline{E}_b \overline{N}_b + \overline{E}_{IHO}$$
$$\overline{N}_{PA\_cng} + \overline{E}_{DHO} Pr[\overline{N}_{PA\_cng} > 0] \qquad (3)$$

where the first two terms represent the energy consumed when WNIC and HD are in doze and idle states, respectively, and are determined by Equation (4):

$$\bar{E}_{WN\_slp} + \bar{E}_{HD\_slp} = (\bar{P}_{WN\_slp} + \bar{P}_{HD\_slp}) \times (P_2 t - T_b \bar{N}_b - T_p - T_{IHO} \bar{N}_{PA\_cng} - T_{DHO} Pr[\bar{N}_{PA\_cng} > 0])$$ (4)

It is assumed that $P_2 t? T_p$, which should be reasonable. Second, the energy required for paging $\bar{E}_p = \bar{P}_{WN\_awk} T_p$ and $l_{in}/(l_{in}+l_{out})$ represents the proportion of the incoming calls. Third, the energy for the periodic beacon listening $\bar{E}_b \bar{N}_b = \bar{P}_{WN\_awk} T_b \bar{N}_b$, in which the number of the beacon listening in the IM during time t is $\bar{N}_b = P_2 t / T_{bli}$. Fourth, the energy consumed for each idle handoff is $\bar{E}_{IHO} = \bar{P}_{WN\_awk}(T_{ras} + T_{das})$ and idle handoffs occur $\bar{N}_{PA\_cng}$ times, where $\bar{N}_{PA\_cng} = l_{PA} P_2 t$. Finally, when the MH moves across a PA boundary at least once with probability $Pr[\bar{N}_{PA\_cng} > 0]$, a delayed handoff is initiated once, and $\bar{E}_{DHO} = (\bar{P}_{WN\_awk} + \bar{P}_{HD\_act})(T_{DOH} + T_{HD\_trans})$. Since it is assumed that the PA sojourn time follows exponential distribution, $Pr[\bar{N}_{PA\_cng} > 0] = 1 - e^{-l_{PA} P_2 t}$.

On the other hand, if the IM is not employed, $\bar{E}_2 = \bar{E}_{PSM}$ and the energy of the power saving mode is expressed by Equation (5):

$$\bar{E}_{PSM} = \bar{E}_{WN\_slp} + \bar{E}_{HD\_act} + \bar{E}_b \bar{N}_b + \bar{E}_{L2HO} \bar{n}_{L2HO} + \bar{E}_{L3HO} \bar{N}_{L3HO}$$ (5)

where $\bar{E}_{L2HO} = (T_{ras} + T_{auth} + T_{IAPP} + T_{1x}) \bar{P}_{WN\_slp}$ and $\bar{E}_{L3HO} = T_{L3HO} \bar{P}_{WN\_awk}$, in which $\bar{P}_{L3HO}$ is the required power for IP handoff operation. $\bar{N}_{L2HO}$ and $\bar{N}_{L3HO}$ are $l_{cs} P_2 t$ and $l_{PA} P_2 t$, respectively.

Consequently, the average power consumption of an MH can be determined as $\bar{P}_{total} = (\bar{E}_1 + \bar{E}_2)/t$.

Table 2 lists the values of all the parameters used for the numerical evaluation including (a) the measure values (from Cisco AP and WNIC), (b) the values from the data sheets (related to the power consumption) of prior arts, and finally (c) some assumed values. For the simplicity, the state transition overhead of a WNIC is ignored.

TABLE 2

| Parameter | Value | Parameter | Value |
|---|---|---|---|
| Measured values | | | |
| $T_b$ | 500 μs | $T_p$ | 5 ms |
| $T_{ras}$ | 1.3 ms | $T_{das}$ | 0.1 ms |
| $T_{L2HO}$ | 178 ms | $T_{bli}$ | 100 ms/1 s |
| From the data sheet | | | |
| $\bar{P}_{WN\_awk}$ | (925 + 2565)/2 mW | $\bar{P}_{WN\_slp}$ | 45 mW |
| $\bar{P}_{HD\_act}$ | 625 mW | $\bar{P}_{HD\_slp}$ | 86 mW |
| Assumed values | | | |
| $\lambda_{in}$ | 2 times/h | $\lambda_{out}$ | 2 times/h |
| $1/\lambda_s$ | 5 min | $T_{L3HO}$ | 2 s |
| $1/\lambda_{PA}$ | √APs per PA/$\lambda_{cs}$ | Cell radius | 115 meters |
| Battery cap. | 1250 mAh | APs per PA | 10 |

Figure 5:
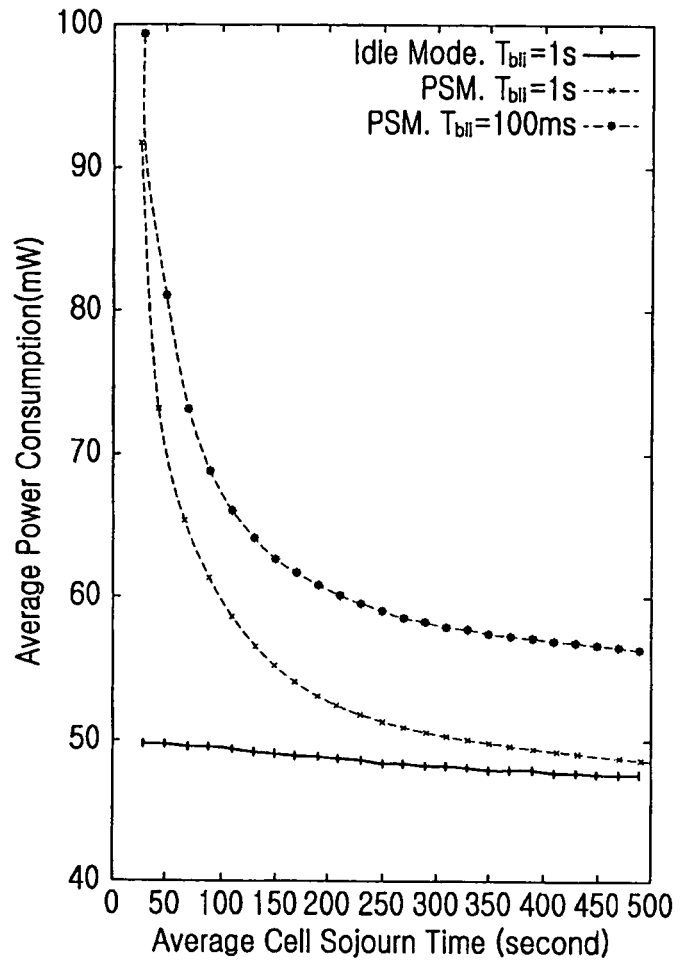
FIG. 5 is a graph showing average power consumption curves of a WNIC when in the State 2 as the cell sojourn time varies.

FIG. 5 is a graph showing average power consumption curves of a WNIC when in the State 2 as the cell sojourn time varies.

From FIG. 5, it is observed that the power saving method of the present invention consumes less power than the legacy scheme with different beacon listening interval $T_{bli}$. Even if the same value of $T_{bli}$ is used for both the legacy scheme and the present invention, the present invention outperforms the legacy scheme due to the fact that present invention is not required to perform a handoff at every cell boundary. As the power consumption required for the legacy scheme, as the cell sojourn time increases, the power consumption for handoff decreases, and eventually converges to a constant value.

Figure 6:
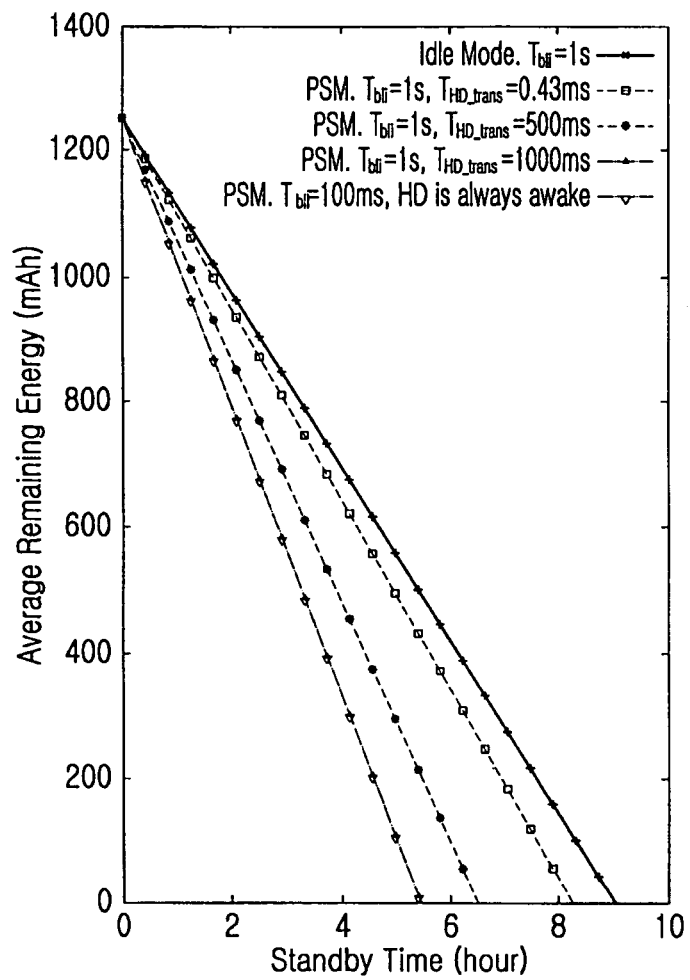
FIG. 6 is a graph showing remaining energy curves as the standby time increases when the average sojourn time is set to 20 seconds.

FIG. 6 is a graph showing remaining energy curves as the standby time increases when the average sojourn time is set to 20 seconds.

For more pair comparison, an ideal legacy scheme is considered, which will be difficult to realize in the real world. Under this scheme, HD wakes up to process broadcast/multicast packets only when these arrive. Otherwise, the HD keeps itself at the standby mode. In order to wake up, the HD needs a transition time, which could vary from 0.43 ms to 1143 ms. The power consumption with this ideal scheme can be easily derived from Equation (5) by adjusting $\bar{E}_{HD\_act}$ accordingly. As discussed above, the performance of IP paging scheme is heavily affected by broadcast/multicast packets while tens of such packets are expected in each $T_{bli}$ (=1 s). However, it is assumed that the time to receive and process such packets to be zero, for simplicity. This will make the analytical result of the ideal scheme being an upper bound of the actual performance.

As shown in FIG. 6, it takes 9.04 hours to exhaust an MH's energy if the present invention is employed while it takes 5.43 hours for the legacy scheme with $T_{bli}$ set to 100 ms and HD always active. For the ideal scheme, three different transition time values, i.e., minimum (0.43 ms), average, and maximum (1143 ms) are considered. It is observed that the present invention outperforms all different forms of the legacy scheme, i.e., even the ideal legacy scheme with 0.43 ms transition time. From all the above observations, the present invention makes an MH maintain the standby mode for a longer period of time since it needs less energy consumption compared with legacy scheme.

As described above, the power saving method of the present invention minimizes the operations for handoffs of a mobile host, it is possible to improve the power consumption efficiency.

As described above, the power saving method of the present invention supports the idle mode operation in the 802.11 WLAN and is standard-compliant, such that it can be easily applied to the presently deployed products by just updating their firmware or device drivers.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A power saving method for a wireless local area network comprising a plurality of access points providing at least one mobile station in each access point cell with an access service, a mobile station transiting between an active mode and an idle mode, the method comprising the steps of:

grouping the plurality of access points into at least one paging group with a paging group boundary;

determining if the mobile station is in the idle mode in which the mobile station switches between an awake state and a doze state every predetermined time interval, or in the active mode in which the mobile station is in the awake state;

if the mobile station is in the idle mode, activating an idle handoff, which occurs only when the mobile station moves across the paging group boundary, the idle handoff being performed in a media access control level; and performing handoff operations related to an activation of an internet protocol layer after a successful completion of paging, wherein the idle handoff comprises a home access point of the mobile station transmitting, to a most recently associated access point of the mobile station, a page-notify message that initiates an access point receiving the page-notify message to page the mobile station, and the most recently associated access point transmitting the page-notify message to at least one access point in a paging group of the most recently associated access point.

2. The method of claim 1, wherein the paging group boundary is defined by cells of the plurality of access points.

3. The method of claim 1, further comprising:
activating a regular handoff, which occurs whenever the mobile station moves across a boundary of the access point cell, if the mobile station is in the active mode.

4. The method of claim 3, wherein the regular handoff comprises media access control level operations.

5. The method of claim 4, wherein the regular handoff comprises internet protocol level operations.

6. The method of claim 1, further comprising:
determining if the mobile station is paged in the awake state of the idle mode; and
transiting to the active mode if the mobile station is paged.

7. The method of claim 1, further comprising:
determining if data to be transmitted is generated in the idle mode; and
transiting to the active mode if the data is generated.

8. The method of claim 1, wherein a new access point, among the plurality of access points in a paging group, broadcasts, to other access points among the plurality of access points in the same paging group, information of the successful completion of the paging to stop the paging in the other access points.

9. A power saving method for a wireless communication system comprising a plurality of stationary stations providing at least one mobile station in each stationary station cell with an access service, a mobile station transiting between an active mode and an idle mode, the method comprises the steps of:
grouping the plurality of stationary stations into at least one paging group with a paging group boundary;
determining if the mobile station is in the idle mode or the active mode;
if the mobile station is in the idle mode, performing a handoff only when the mobile station moves across the paging group boundary, the handoff being a media access control level handoff; and
performing handoff operations related to an activation of an internet protocol layer after a successful completion of paging,
wherein the idle handoff comprises a home access point of the mobile station transmitting, to a most recently associated access point of the mobile station, a page-notify message that initiates an access point receiving the page-notify message to page the mobile station, and the most recently associated access point transmitting the page-notify message to at least one access point in a paging group of the most recently associated access point.

10. The method of claim 9, wherein the paging group boundary is defined by cells of the plurality of stationary stations.

11. The method of claim 9, further comprising:
performing a regular handoff when the mobile station moves across a boundary of the stationary station cell as well as the paging group boundary, if the mobile station is in the active mode.

12. The method of claim 11, wherein the regular handoff is a media access control level handoff.

13. The method of claim 9, further comprising:
determining if the mobile station is paged by one of the plurality of stationary stations; and
performing an internet protocol level handoff if the mobile station is paged.

14. A power saving method for a wireless communication system comprising a plurality of stationary stations providing at least one mobile station in each stationary station cell with an access service, a mobile station transiting between an active mode and an idle mode, the method comprising the steps of:
grouping the plurality of stationary stations into at least one paging group with a paging group boundary;
determining if the mobile station is in the idle mode or the active mode;
if the mobile station is in the idle mode, performing a handoff when the mobile station moves across the paging group boundary, not across a boundary of the stationary station cell, the handoff being a media access control level handoff; and
performing handoff operations related to an activation of an internet protocol layer after a successful completion of paging,
wherein the idle handoff comprises a home access point of the mobile station transmitting, to a most recently associated access point of the mobile station, a page-notify message that initiates an access point receiving the page-notify message to page the mobile station, and the most recently associated access point transmitting the page-notify message to at least one access point in a paging group of the most recently associated access point
wherein the idle handoff comprises a most recently associated access point of the mobile station requesting, to a home access point of the mobile station, a media access control address of the mobile station, receiving, from the home access point, the media access control address, and validating the mobile station based on the media control address.

15. The method of claim 14, wherein the paging group boundary is defined by cells of the plurality of stationary stations.

16. The method of claim 14, further comprising:
performing a regular handoff when the mobile station moves across both a boundary of the stationary station cell and the paging group boundary, if the mobile station is in the active mode.

17. The method of claim 16, wherein the regular handoff in the active mode is an internet protocol level handoff.

18. The method of claim 16, wherein:
the handoff in the idle mode is a media access control level handoff; and
the regular handoff in the active mode is an internet protocol level handoff.

19. The method of claim 14, further comprising:
determining if the mobile station is paged by one of the plurality of stationary stations; and
transiting from the idle mode to the active mode if the mobile station is paged.

20. The method of claim 14, further comprising:
determining if the mobile station comprises data to transmit; and
transiting from the idle mode to the active mode if the mobile station comprises the data to transmit.

* * * * *